M. B. MILLS.
WEIGHING SCALE.
APPLICATION FILED JUNE 27, 1917.

1,327,208.

Patented Jan. 6, 1920.
6 SHEETS—SHEET 1

Witnesses:

Inventor:
Mortimer B. Mills,
By Dyrenforth, Lee, Chritton and Wiles
Attys.

M. B. MILLS.
WEIGHING SCALE.
APPLICATION FILED JUNE 27, 1917.

1,327,208.

Patented Jan. 6, 1920.
6 SHEETS—SHEET 2.

Witnesses:

Inventor:
Mortimer B. Mills,
By Dyrenforth, Lee, Chritton & Wiles
Attys.

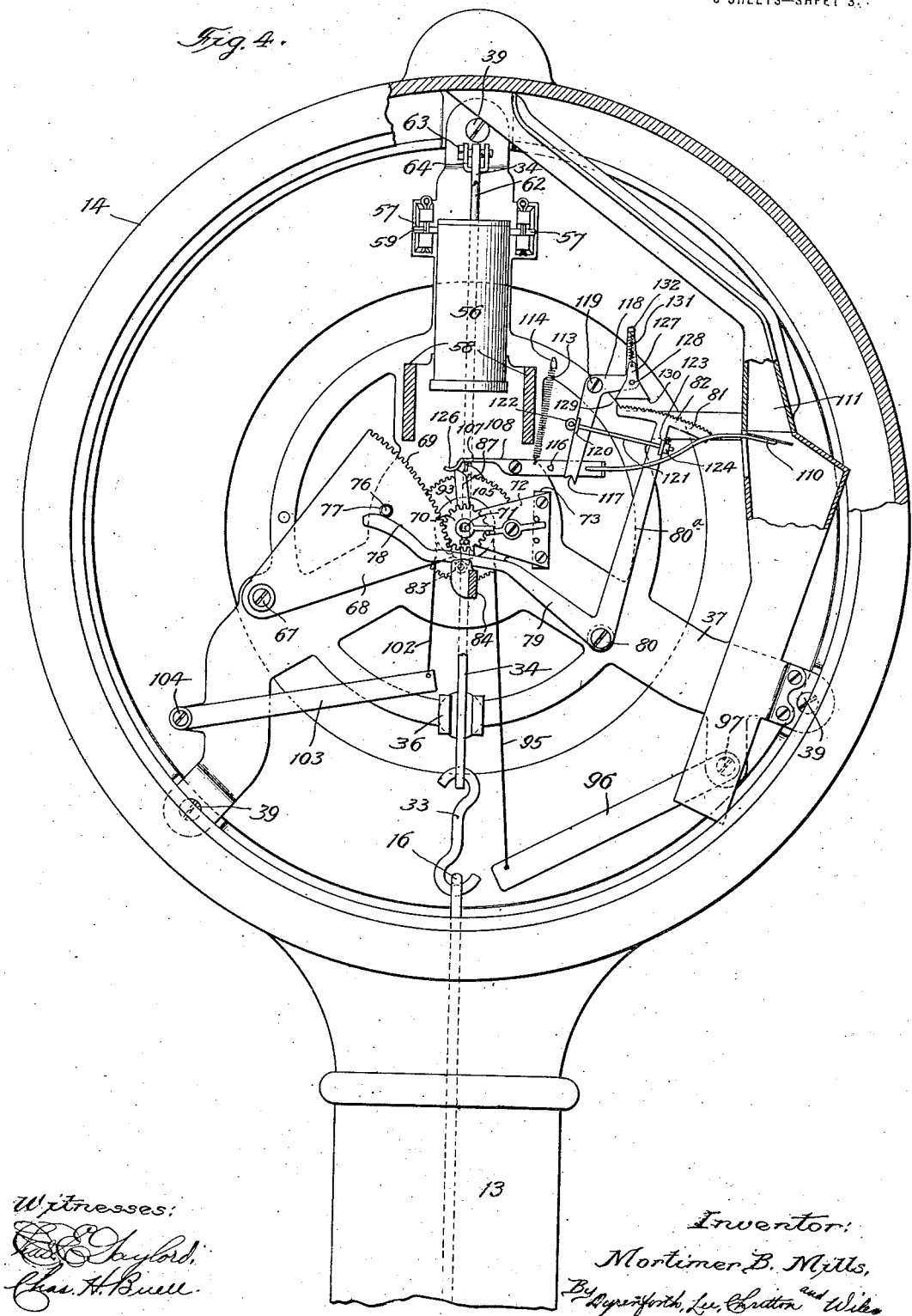

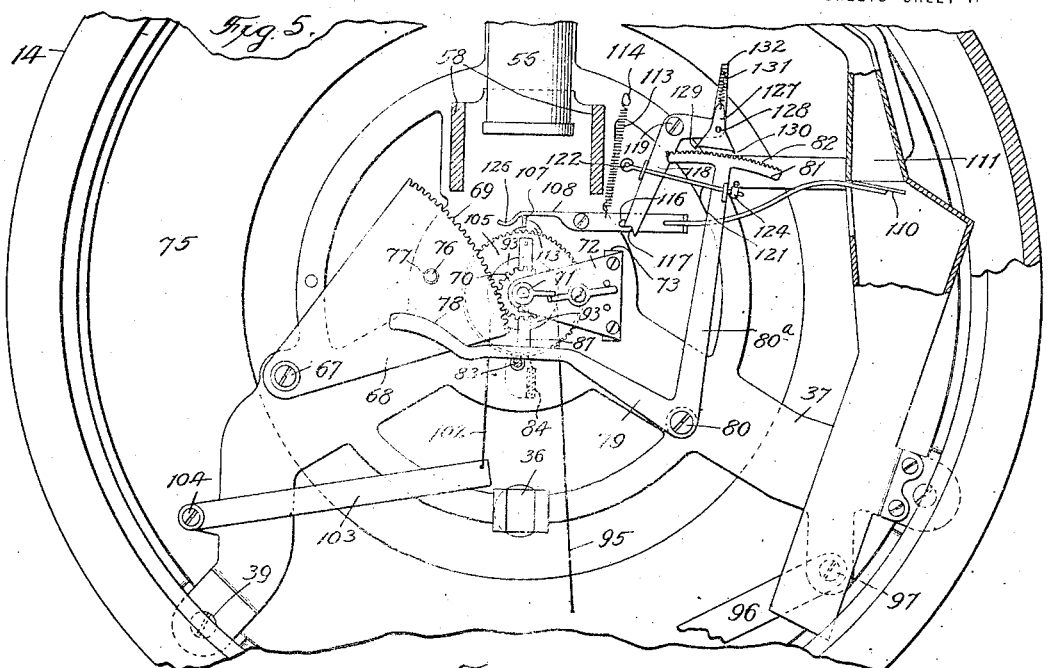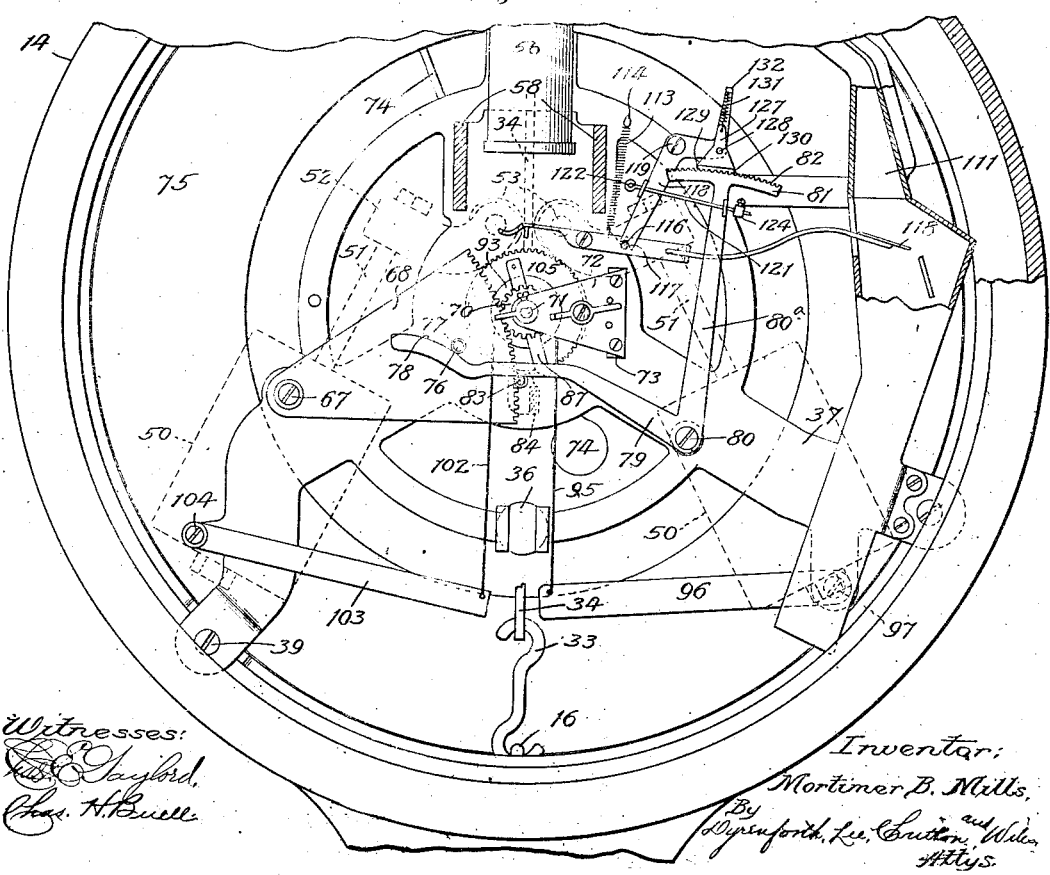

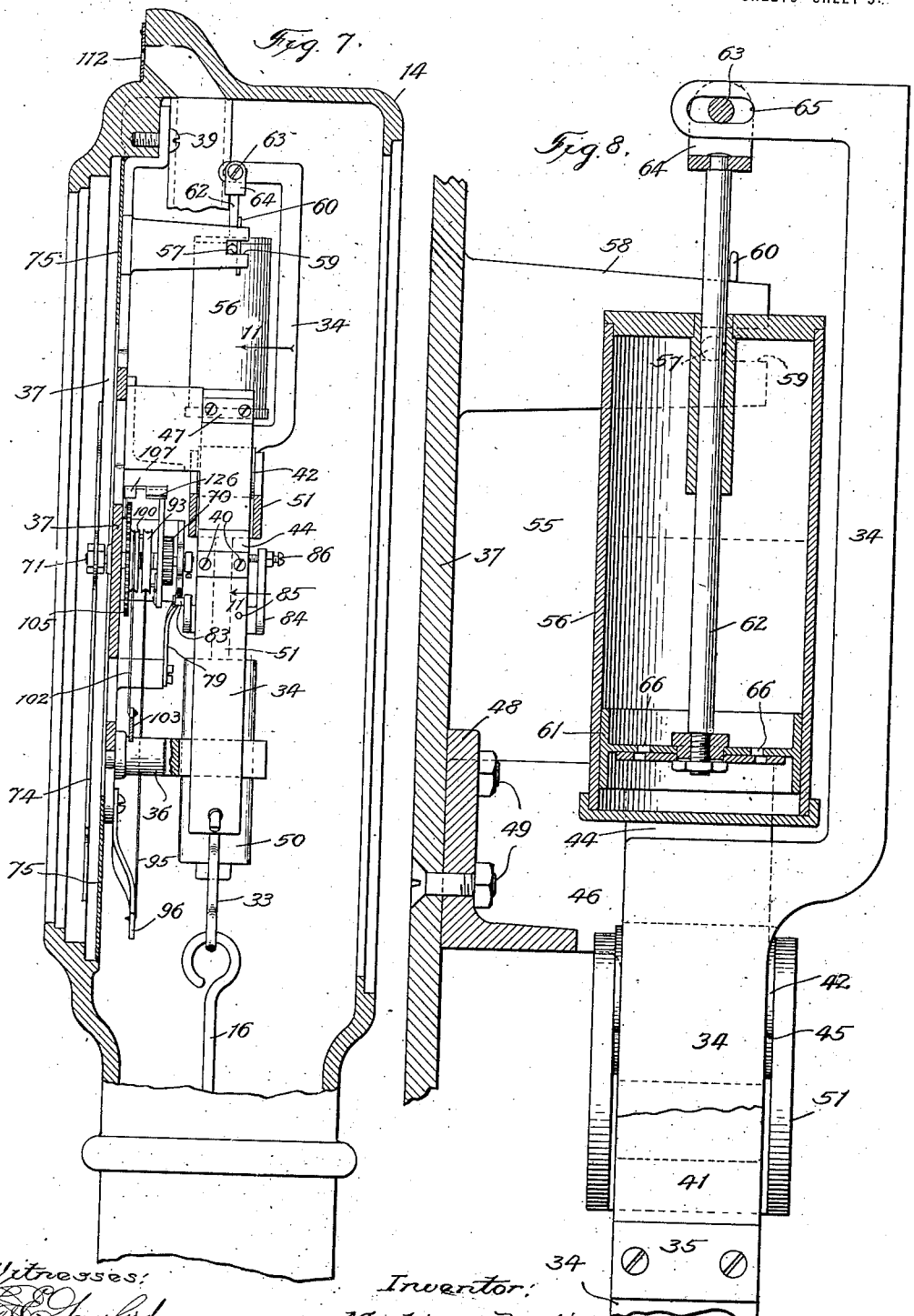

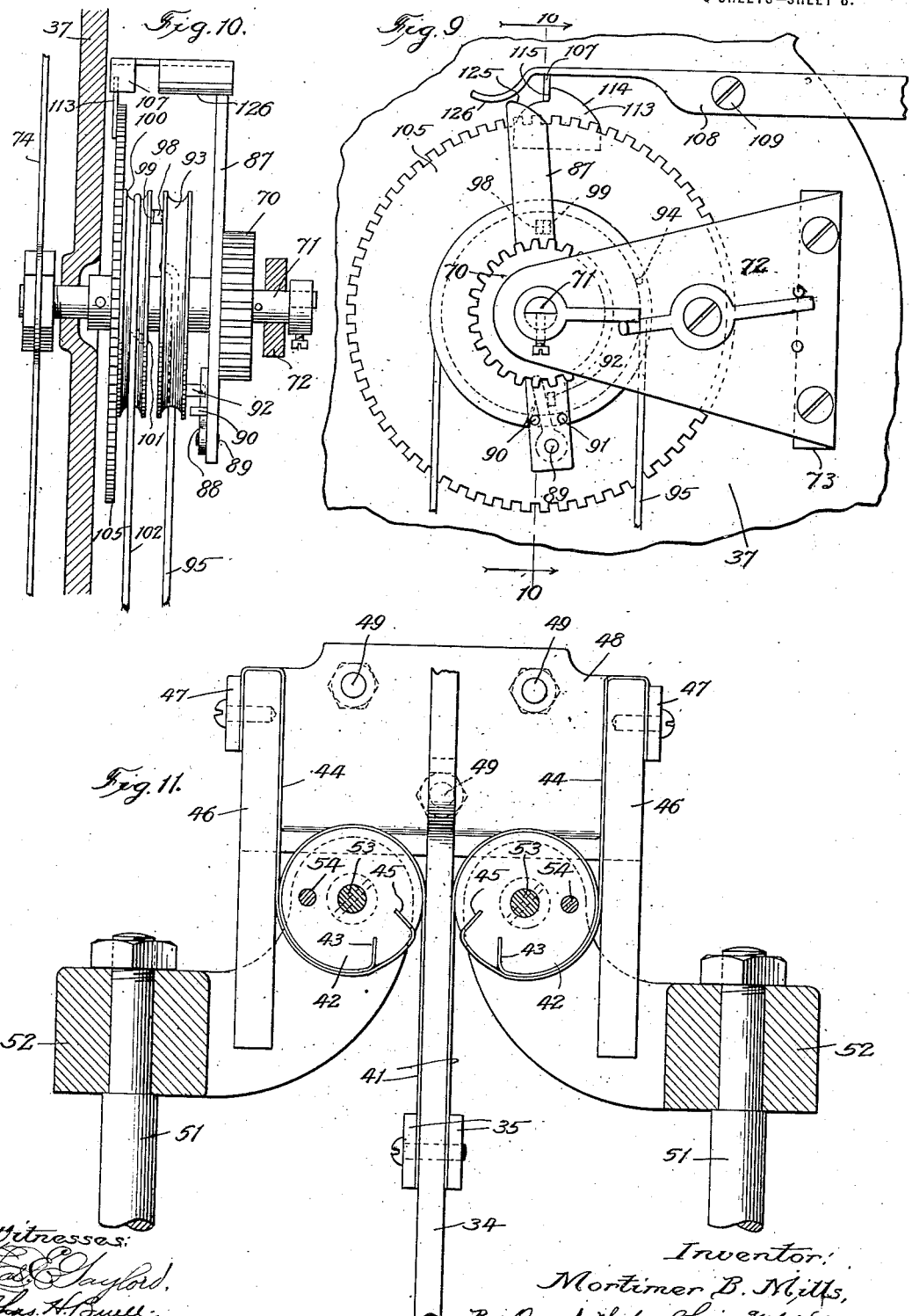

UNITED STATES PATENT OFFICE.

MORTIMER B. MILLS, OF CHICAGO, ILLINOIS, ASSIGNOR TO MILLS NOVELTY COMPANY, OF CHICAGO, ILLINOIS, A CORPORATION OF ILLINOIS.

WEIGHING-SCALE.

1,327,208.

Specification of Letters Patent.   Patented Jan. 6, 1920.

Application filed June 27, 1917.   Serial No. 177,201.

*To all whom it may concern:*

Be it known that I, MORTIMER B. MILLS, a citizen of the United States, residing at 431 North Long avenue, Chicago, in the county of Cook and State of Illinois, have invented a new and useful Improvement in Weighing-Scales, of which the following is a specification.

My primary object is to provide a novel, relatively simple and positively operating scale, which shall present the minimum friction of the operating parts and operate to indicate accurately the weight of the object placed on the scale.

Referring to the accompanying drawings, wherein my invention is illustrated in a coin-controlled weighing scale,—

Figure 2:
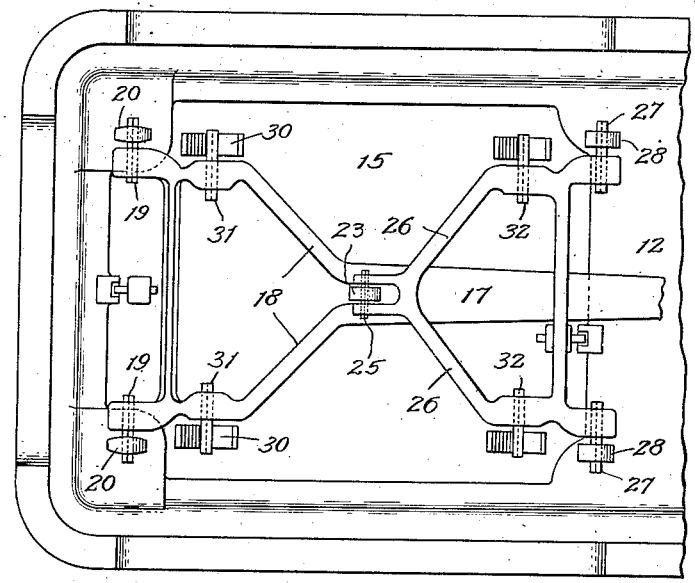
Figure 1:
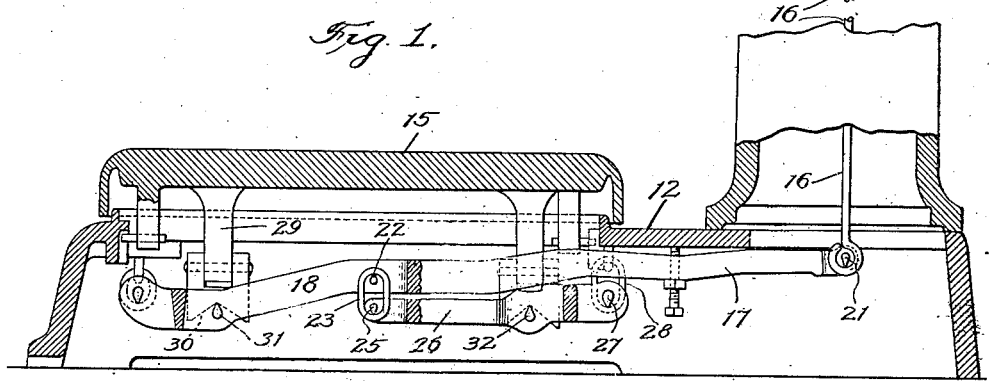
Figure 3:
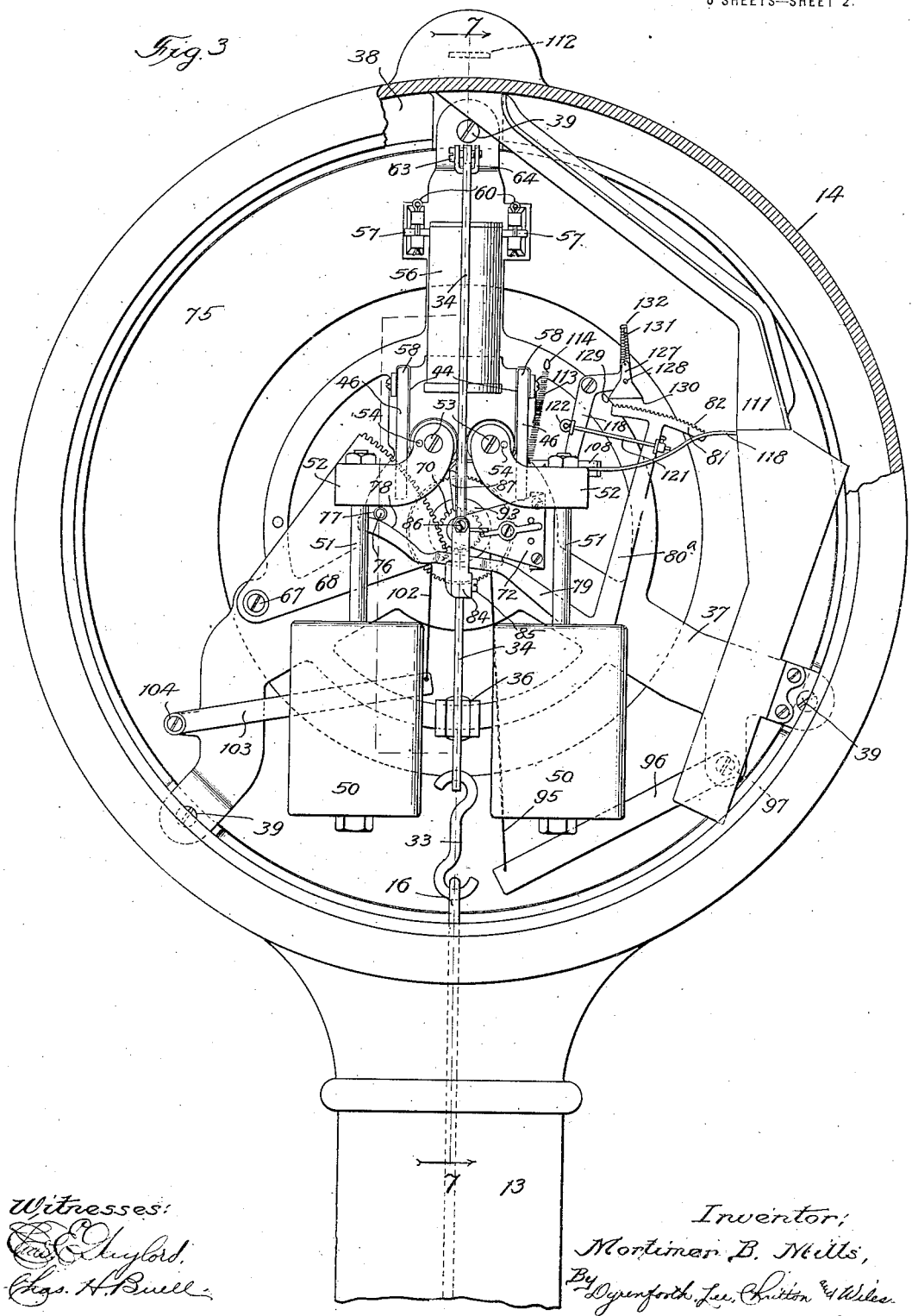

Figure 1 is a view in elevation of the weighing scale with certain parts broken away and the lower portion shown in section. Fig. 2 is a bottom plan view of the base of the scale. Fig. 3 is an enlarged view in rear elevation of the upper portion of the scale, with the rear cover-plate removed and with a certain portion of the casing in section, the parts illustrated being in normal position, or, in other words, when no weight is on the weighing platform. Fig. 4 is a view similar to Fig. 3, with certain of the parts shown in the foreground in this figure, removed to disclose details of parts which otherwise would be obscured. Fig. 5 is a view like Fig. 4, showing the parts of the scale in the position they occupy when a certain weight of object is applied to the scale platform and before a coin has been inserted into the machine. Fig. 6 is a view like Fig. 5, showing the position of the parts following the introduction of a coin into the machine, certain of the parts shown in Fig. 3, and not shown in Fig. 5, being indicated in this figure by dotted lines. Fig. 7 is a section taken at the line 7, 7, on Fig. 3 and viewed in the direction of the arrows. Fig. 8 is an enlarged broken view in sectional elevation of the dash-pot mechanism of the scale, for preventing undue oscillation of the mechanism controlling the position of the pointer relative to the dial of the scale. Fig. 9 is a broken view in rear elevation of a portion of the mechanism directly coöperating with the pointer of the scale, for controlling its operation. Fig. 10 is a section taken at the line 10, 10, on Fig. 9 and viewed in the direction of the arrows; and Fig. 11 is an enlarged section taken at the line 11 on Fig. 7 and viewed in the direction of the arrow.

The casing of the scale comprises a hollow base-portion 12 surmounted by a hollow column 13 carrying at its upper end a casing-section 14, as is common in scales of this general character, the base 12 having a platform 15 upon which the object to be weighed is placed. The column 13 contains a vertically reciprocable rod 16 connected at its lower end with lever mechanism supporting the platform 15, this rod connecting at its upper end with mechanism hereinafter described, in the casing 14. In the particular arrangement shown, the mechanism connecting the rod 16 with the platform 15 comprises a lever 17, supported at its forward bifurcated portion 18 upon knife-edged pivots 19 secured in the arms of this bifurcated portion and resting in eyes depending from the casing 12, the opposite end of this lever being connected with the lower end of the rod 16, through the medium of a pin 21. The lever 17 is provided with a pin 22 intermediate its ends, which supports a ring 23 with which a lever 24 is connected through the medium of a pin 25 provided on one end of this lever and extending through the link 23. The opposite end of this lever, which is bifurcated as indicated at 26, carries knife-edges 27, which are supported in links 28 connected at their upper ends with the lever 17. The platform 15 is provided with four lugs 29, arranged substantially at its four corners and depending therefrom, the bottom surfaces of these lugs being recessed, as indicated at 30, and bearing at said recessed portions upon knife-edges 31 and 32 carried by the levers 17 and 24, respectively.

The upper end of the rod 16 is flexibly connected, as by a link 33, with a vertically-movable bar 34, which extends upwardly between the arms 35 of a rearwardly-extending post 36 secured to a frame 37 which is secured to an annular rim 38 extending inwardly at the front open side of the casing 14, this frame being secured in position as by the screws 39. The bar 34 is connected, as by the screws 40, with the lower ends of bands 41 disposed at opposite sides of this bar, and which pass upwardly from their point of connection therewith, over cylindrical rollers 42, to which they are connected, as indicated at 43, these rollers also being connected with other bands 44, as indicated at 45, these bands being superposed on adjacent portions of the bands 41, as represented more particularly in Fig. 11, and extending upwardly along the inner sides of stationary plates 46, which are spaced apart and extend parallel with each other and with the bar 34, the upper ends of the bands 44 being secured in position to the plates 46 as by the clamping plates 47. The plates 46, which preferably are formed as a part of a casting 48 secured to the frame 37, as by the bolts 49, are preferably so spaced that the rollers 42, with the bands 41 and 44 wound upon them as stated, will snugly fit between these plates and bar 34, but without binding. The rollers 42 which, in the operation of the scale as hereinafter more fully described, are caused to rotate and move in a vertical plane, are eccentrically weighted to offer resistance to forces tending to unwind the bands 41 and 44 from these rollers, this weighting in the particular construction illustrated being effected by the weights 50 mounted on the lower ends of rods 51, secured at their upper ends in yoke-shaped members 52 which straddle the rollers 42 and the respective plates 46, and are secured to these rollers against relative rotation by means of connecting bolts 53 which extend through the arms of the members 52 and through the rollers 42, and eccentrically disposed pins 54 passing through the arms of these yokes and into these rollers.

It may be here stated that in the operation of the scale the application of weight to the platform 15 operates to lower the rod 16 and consequently the bar 34, with the result of pulling downwardly on the bands 41 and exerting force against the rollers 42, tending to unwind the bands 41 from these rollers and unwind these rollers from the bands 44, the rotation of these rollers being opposed by the weight exerted by the parts 50, 51 and 52, the rod 16 thus lowering to an extent commensurate with the weight placed upon the platform.

The bands 41 and 44 by which these floating rollers are supported should be of a material which is relatively non-stretchable under the weight of objects which it is intended to be weighed on the scale, and while any suitable material may be employed, I prefer to construct these bands of shim steel which is relatively inelastic and which may be provided of a thickness of about $\frac{3}{1000}$ inch in thickness and about an inch wide.

It will be manifest that inasmuch as the contact provided between the rollers 42 and the bands 41 and 44 is a rolling contact, friction is eliminated.

The upper end of the bar 34 preferably coöperates with dash-pot mechanism represented at 55, for preventing undue oscillation of the operating parts just described when an object is placed on the platform, this dash-pot mechanism comprising a cylinder 56 supported in vertically-extending position at pivots 57 thereon, from rearwardly-extending lugs 58 provided on the frame 37, the pivots 57 extending into recesses 59 in the rear ends of these lugs and held therein by pins 60, and a piston member 61 slidable up and down in the cylinder 56 and carried on the lower end of a rod 62, vertically reciprocable through an opening in the top of the cylinder 56, and connected at its upper end with the bar 34 through the medium of a pin 63 carried by a yoke 64 on the upper end of this rod, and extending through a slot 65 in the bar 34. The piston which operates in a body of liquid, as for example oil, in the cylinder, contains openings 66 to permit of the escape from the underside of the piston of the liquid beneath it, in accordance with the dash-pot structures as commonly provided.

Pivotally connected at the pin 67 extending rearwardly from the frame 37, is a segmental rack-member 68, the teeth 69 of which mesh with the teeth of a pinion 70 rotatably supported on a shaft 71 journaled at its forward end in the central portion of the frame 37, and at its rear end in a plate-member 72 secured to the frame 37 to extend in spaced relation thereto, through the medium of a block 73, the forward end of the shaft 71, where it extends beyond the frame 37, carrying the pointer 74 which is rigid thereon and is provided for coöperation with a circular scale, (not shown) and having uniform graduations, provided in accordance with common practice, on the front face of a disk 75 secured against the outer face of the frame 37.

The member 68 is provided, eccentrically of its pivot 67, with a rearwardly-extending pin 76, carrying a roller 77 which, under the action of gravity, is caused to bear against the upper cam-surface 78 of a lever 79 pivoted on a pin 80 extending rearwardly from the frame 37, this lever 79 being formed of a section 80ª rigid therewith, which extends in an upward direction with its upper end in the form of a T, as indicated at 81, and provided with teeth on its upper arc-shaped surface, as represented at 82, to form a rack, the arc in which these teeth extend being preferably struck from the pivot 80 as a center.

The lever 79 bears, under the action of gravity, upon a roller 83 extending forwardly from a yoke-shaped member 84 which loosely straddles the bar 34, and is pivotally connected therewith, as indicated at 85, to permit of the adjustment of this yoke for raising and lowering the roller 83, the rear arm of this yoke carrying a setscrew 86 coöperating with the rear edge of the bar 34, for setting this yoke in adjusted position.

It will be noted from the foregoing that the segmental rack 68 and lever 79 are supported at the roller 83, on the bar 34, and that therefore the position of the bar 34 controls the positions of the parts just referred to, in the operation of the machine as hereinafter described, these parts lowering by the action of gravity as hereinafter described, following the lowering of the bar 34 and rising by engagement with the roller 83 when the bar 34 returns to normal position.

Inasmuch as the ratio between the movement of the bar 34 and loads of different weights applied to the platform, is not constant, the movement of the bar 34 being greater in proportion, as the weight increases, and as it is desirable that the scale coöperating with the pointer present equally spaced and uniform graduations, the cam-lever 79 hereinbefore referred to is provided, the cam-surface 78 being so shaped that these differences will be compensated for and the movement of the segmental rack 68 may be directly proportional to the amount of weight placed on the platform for proper coöperation of the pointer with the scale.

The pinion 70 is rigidly connected with an arm 87, provided at its lower end with a member 88 pivotally connected thereto at 89 and movable between stops 90 and 91 on this lever, the member 88 serving as a stop-surface for coöperation with a pin 92 projecting rearwardly from the face of a sheave 93 journaled on the shaft 71 and connected, as indicated at 94, with the upper end of a cable 95 which partially encircles this sheave and connects at its lower end with a weight, shown as in the form of a lever 96 pivotally supported at 97 and connected at its free end with the cable 95, this weight tending to rotate the sheave 93 in a clockwise direction in Fig. 9. The sheave 93 is provided with a forwardly-projecting lug 98 which coöperates with a similar lug 99 projecting rearwardly from a sheave 100 fixed on the shaft 71, the sheave 100 being connected, as indicated at 101, with the upper end of a cable 102 which extends part way around this sheave, and is connected at its lower end with a weight shown as in the form of a lever 103 pivotally supported at 104 and connected at its free end with the cable 102. The lever 96 is heavier than the rack 68, but is lighter than the combined weight of this rack and the lever 103, the lever 103 serving, in conjunction with the rack 68, to rotate the sheaves 93 and 100 and with it the shaft 71 and pointer 74, in counter-clockwise direction in Fig. 9, against the resistance of the weight 96, to indicate the weight on the dial, when the rotation of the pinion 70, as hereinafter described, moves the lug 98 in a direction away from the lug 99, and certain stop mechanism, hereinafter described, for the shaft 71, is released.

In accordance with the preferred illustrated embodiment of my invention, wherein the operation of the scale is coin-controlled, the coin-controlled locking mechanism coöperates directly with the shaft 71, the following being a description of this mechanism: Rigidly secured to the shaft 71 to rotate therewith is a disk 105, provided on its front face with a projection 113 having a cam-surface 114 and a shouldered portion 115 which interlocks, in the normal position of the machine, with a lug 107 on a lever 108 fulcrumed, as indicated at 109, to the frame 37, the end of of this lever opposite that equipped with the lug 107 extending at the portion indicated at 110 into the coin-chute 111, to extend into the path of a coin introduced into the chute 111 through a coin-slot 112 in the casing of the machine, the lever 108 normally occupying a position in which the lug 107 extends into engagement with the shouldered portion 115, under the action of a spring 113 secured at its upper end to the casing, as indicated at 114, and at its lower end to this lever. The member 105 also is provided about its periphery with teeth 106 for coöperation with the lug 107 as hereinafter described. The lever 108 therefor locks the member 105, pointer-shaft 71, sheaves 100 and 93, pinion 70 and rack 68, against rotation, until a coin introduced into the slot 111 rotates the lever 108 in clockwise direction, in Fig. 4, against the action of the spring 113 and lifts the lug 107 out of engagement with the shoulder 115, whereupon the combined weight of the rack 68 and weight 103, working in opposition to the weight 96, rotates the shaft 71 and pointer 74 to weight-indicating position, assuming that the object to be weighed is on the platform at the time the coin is deposited, the coin in this movement of the lever 108 rolling out of engagement with the latter and discharging from the chute into any suitable receptacle (not shown).

The lever 108 is provided intermediate the pivot 109 and the end 110 thereof, with a pin 116, this pin being provided for coöperation with the notched portion 117 of a bell-crank lever 118, fulcrumed at 119 to the frame 37. The lever 118 carries an apertured lug 120, in which a rod 121, headed at 122, is slidable, the opposite end of this rod extending through an aperture in a lug 123 provided on the member 80ª and headed beyond this lug, as represented at 124. The upper arm of the bell-crank lever 118 carries a pawl-member 127 pivotally connected therewith at 128 and having teeth 129 and 130 spaced apart, the member 127 being connected with the lower end of a coiled spring 131 connected at its upper end, as indicated at 132, to the upper end of the lever 118, this spring tending to hold the member 127 in the position represented in Fig. 4. The teeth 129 and 130 are arranged directly above the rack 82 on the lever-arm 80ª, and the parts are so disposed that when the levers 108 and 118 are in normal position (Fig. 4), the teeth 129 and 130 are out of engagement with the teeth on the rack 82.

The operation of the mechanism is as follows: The placing of a weight on the platform 15 lowers the rod 16 and bar 34 against the action of the eccentrically disposed members carried by the rollers 42, the lowering of the bar 34 as stated lowering the roller 83, and as the cam-lever 79 rests upon the roller 83, this lever follows down with the bar 34 by rocking on its pivot 80 in anti-clockwise direction in Fig. 4 (see Fig. 5). As the lever 108, in normal position, is interlocked at its lug 107, with the shoulder 115 on the member 105, the shaft 71 and all parts carried thereby, and the rack 68, remain in normal position (Fig. 4) until a coin is deposited in the chute 111, whereupon the rocking of the lever 108 in clockwise direction in Fig. 4 to the position shown in Fig. 6, raises the lug 107 out of the path of the shoulder 115. The combined weight of the weights 103 and the rack 68 are thus allowed to act against the resistance of the weight 96, whereupon the rack 68 lowers, and the shaft 71 with all the parts carried thereby rotates in anti-clockwise direction in Fig. 4. The cam-surface 78 forms a stop for the rack 68 and thus determines the position to which the pointer 74 moves over the dial, whereby the weight of the article on the platform is caused to be indicated by the pointer. The rocking of the lever 79 as above stated swings its arm portion 80ª to the left in Fig. 4, which permits the lever 118 to rotate in clockwise direction in Fig. 4 to a position in which its lower end bears against the side of the pin 116 (Fig. 5) (in which position the teeth 129 and 130 are clear of the teeth 82) and in the rotation of the lever 108 in clockwise direction in Fig. 4 under the action of a coin introduced into the chute 111, the pin 116 lowers, permitting the lever 118 to turn to a position in which its notched portion 117 is in the direct line of upward travel of the pin 116 in the return movement of the lever 108 when the coin disengages therefrom. Accordingly the lever 108 becomes releasably locked by the lever 118 as shown in Fig. 6, in which position of the lever 118 the teeth 129 and 130 on the pawl-device 127 extend into the path of the extremities of the adjacent ones of the teeth 82.

When the weight is removed from the platform 15, the weights 50 swing downwardly to normal position Fig. 3, thus restoring to normal position the parts connected therewith, the bar 34 rising in this movement, and rocking the lever 79 from the position in Figs. 5 and 6, to normal position (Fig. 4). The parts of the scale are so proportioned and arranged as shown, that the movement of the lever 79 to normal position as stated, by engagement of the tooth 129 of the pawl-device 127 with the rack 82 rotates the lever 118 in anti-clockwise direction in Fig. 6, withdrawing the latter from engagement with the pin 116 which permits the lever 108 to move to a position in which its lug 107 extends into one of the notches between the teeth 106 on the member 105, thus locking the member 105, shaft 71, pointer 74 and sheave 100 against rotation. The rocking of the lever 79 as stated also operates to swing the rack 68 upwardly, which rotates the pinion 70 in clockwise direction in Fig. 6, the arm 87 in this movement rotating in the same direction and in its final movement to normal position (Figs. 4 and 9), the upper cam-shaped portion 125 of this arm engages a deflected portion 126 of the lever 108, rocking the latter to a position in which the lug 107 is disengaged from the member 105 whereupon, under the weight of the member 96, the sheaves 93 and 100, member 105, shaft 71 and pointer 74 are returned to normal position, bringing the pointer back to zero, the cable 102 in this operation winding upon the sheave 100 and raising the weight 103. In the final movement of the member 105 to normal position the cam 113 rides against the under surface of the lug 107 and the latter drops into engagement with the shoulder 115 to again lock the member 105 against rotation until a coin is deposited in the machine. In the final movement of the lever 79 to normal position the lever 118 is further swung in anti-clockwise direction in Fig. 4 to the position shown in this figure, by means of the engagement of the rod 121 therewith, thereby lifting the pawl-device 127 clear of the teeth 82.

The parts are preferably so constructed and arranged that should a second person step on to the platform 15 while the first person weighed is still on the platform, the engagement of the lever 79 at its teeth 82 with the tooth 130 will operate to swing the lever 118 out of engagement with the pin 116, whereupon the lever 108 rocks to a position in which its lug 107 enters one of the notches in the periphery of the member 105 between the teeth 106 thereon and locks the shaft 71 against rotation, and thus prevents the obtaining of the combined weight of the persons on the platform 15.

Should an attempt be made to obtain the separate weight of two persons by the deposit of a single coin, by the person whose weight was indicated stepping from the scale at the same time another person steps on to it, which will cause either an increase in the weight on the scale with the result above stated, or a decrease in the weight on the scale, the scale will nevertheless not indicate the proper weight of the second party as the decrease in the weight on the scale will cause the lever 79 to rotate in clockwise direction in Fig. 6 and through the medium of the pawl-device 127 (which engages at its tooth 129 with a tooth 82) acting on the lever 118 will disengage the latter from the pin 116 and lock the member 105 and consequently the pointer, against rotation.

What I claim as new and desire to secure by Letters Patent is:—

1. In a weighing-scale, the combination of mechanism adapted to be shifted by application of weight to the scale, the movement of which is not directly proportional to increase in weight applied to the scale, weight-indicating means, and means separate from, and controlled by, said mechanism for controlling said weight-indicating means and comprising a cam-device supported by, and movable responsive to, said mechanism and upon which said means rest and against which the latter move, said cam-device being constructed and arranged to cause said weight-indicating means in moving against it to have movement directly proportional to the increase in weight applied to the scale, under the disproportional movement of said mechanism.

2. In a weighing-scale, the combination of mechanism adapted to be shifted by application of weight to the scale, the movement of which is not directly proportional to increase in weight applied to the scale, weight-indicating means, and means separate from, and controlled by, said mechanism for controlling said weight-indicating means and comprising a movable cam-device means supported by, and movable responsive to, said mechanism and upon which said means rest and against which the latter move, said cam-device being constructed and arranged to cause said weight-indicating means in moving against it to have movement directly proportional to the increase in weight applied to the scale, under the disproportional movement of said mechanism.

3. In a weighing scale, the combination of mechanism adapted to be shifted by application of weight to the scale, the movement of which is not directly proportional to increase in weight applied to the scale, weight-indicating means comprising a rock-member through the medium of which the movement of said means is controlled, a movable cam-device for controlling the movement of said rock-member, and means controlled by said mechanism for controlling the movement of said cam-device.

4. In a weighing scale, the combination of mechanism adapted to be shifted by application of weight to the scale, the movement of which is not directly proportional to increase in weight applied to the scale, weight-indicating means comprising a rock-member through the medium of which the movement of said means is controlled, a movably-supported lever having a cam, for controlling the movement of said rock-member, and means controlled by said mechanism for controlling the movement of said cam-equipped lever.

5. In a weighing-scale, the combination of mechanism comprising a member adapted to be shifted by application of a weight to the scale, a floating rotatable member with a weight thereon extending eccentrically of the axis of said rotatable member and means for rotating said rotatable member from said first-named member when a weight is applied to the scale, in opposition to said eccentrically disposed weight, weight-indicating means, and means controlled by said mechanism for controlling said weight-indicating means in the movement of the latter in the direction of movement of said mechanism, and constructed and arranged to cause said weight-indicating means to have movement directly proportional to the increase in weight applied to the scale, under the disproportional movement of said mechanism.

6. In a weighing-scale, the combination of mechanism comprising a member adapted to be shifted by application of a weight to the scale, a floating rotatable member with a weight thereon extending eccentrically of the axis of said rotatable member, and means for rotating said rotatable member from said first-named member when a weight is applied to the scale, in opposition to said eccentrically disposed weight, weight-indicating means, and means separate from, and controlled by, said first-named member for controlling said weight-indicating means in the movement of the latter in the direction of movement of said mechanism, and constructed and arranged to cause said weight-indicating means to have movement directly proportional to the increase in weight applied to the scale under the disproportional movement of said first-named member.

7. In a weighing-scale, the combination of mechanism comprising a member adapted to be shifted by application of a weight to the scale, a floating rotatable member with a weight thereon extending eccentrically of the axis of said rotatable member and means for rotating said rotatable member from said first-named member when a weight is applied to the scale, in opposition to said eccentrically disposed weight, weight-indicating means, and means controlled by said mechanism for controlling said weight-indicating means in the movement of the latter in the direction of movement of said mechanism, and comprising a cam-device operatively engaged by said weight-indicating means and movable under the control of said mechanism, said cam-device being constructed and arranged to cause said weight-indicating means to have movement directly proportional to the increase in weight applied to the scale, under the disproportional movement of said mechanism.

8. In a weighing-scale, the combination of mechanism comprising a member adapted to be shifted by application of a weight to the scale, a floating rotatable member with a weight thereon extending eccentrically of the axis of said rotatable member, and means for rotating said rotatable member from said first-named member when a weight is applied to the scale, in opposition to said eccentrically disposed weight, weight-indicating means, and means controlled by said mechanism for controlling said weight-indicating means in the movement of the latter in the direction of movement of said mechanism and comprising a movable cam-device operatively engaging said mechanism and movable responsive thereto, said cam-device being constructed and arranged to cause said weight-indicating means to have movement directly proportional to the increase in weight applied to the scale under the disproportional movement of said mechanism.

9. In a weighing-scale, the combination of mechanism comprising a member adapted to be shifted by application of a weight to the scale, a rotatable member with a weight thereon extending eccentrically of the axis of said rotatable member and means for rotating said rotatable member from said first-named member when a weight is applied to the scale, in opposition to said eccentrically disposed weight, weight-indicating means, comprising a rock member controlling the movement of said means, a movable cam-device for controlling the movement of said rock-member, and means controlled by said mechanism for controlling the movement of said cam-device.

10. In a weighing-scale, the combination of mechanism comprising a member adapted to be shifted by application of a weight to the scale, a rotatable member with a weight thereon extending eccentrically of the axis of said rotatable member and means for rotating said rotatable member from said first-named member when a weight is applied to the scale, in opposition to said eccentrically disposed weight, weight-indicating means comprising a rock-member controlling the movement of said means, a rock-lever provided with a cam for controlling the movement of said rock-member, and means controlled by said mechanism for controlling the movement of said lever.

11. In a weighing-scale, the combination of mechanism comprising a member adapted to be shifted by application of a weight to the scale, a rotatable member with a weight thereon extending eccentrically of the axis of said rotatable member and means for rotating said rotatable member from said first-named member when a weight is applied to the scale, in opposition to said eccentrically disposed weight, weight-indicating means comprising a rock-member controlling the movement of said means, a movable cam-device for controlling the movement of said rock-member, and means on said first-named member for controlling the movement of said cam-device.

12. In a weighing-scale, the combination of mechanism comprising a member adapted to be shifted by application of a weight to the scale, a rotatable member with a weight thereon extending eccentrically of the axis of said rotatable member and means for rotating said rotatable member from said first-named member when a weight is applied to the scale, in opposition to said eccentrically disposed weight, weight-indicating means comprising a rock-member controlling the movement of said means, a movable cam-device engaging said rock-member and against which the latter bears in the movements of said cam-device, and a projection on said mechanism supporting said cam-device.

13. In a weighing-scale the combination of mechanism comprising a member adapted to be shifted by application of a weight to the scale, a floating rotatable member with a weight thereon extending eccentrically of the axis of said rotatable member and means for rotating said rotatable member from said first-named member when a weight is applied to the scale, in opposition to said eccentrically-disposed weight, weight-indicating means and means directly engaging said member and controlling said weight-indicating means in the movement of said member, and constructed and arranged to cause said weight-indicating means to have movement directly proportional to the increase in weight applied to the scale, under the disproportional movement of said mechanism.

MORTIMER B. MILLS.